United States Patent [19]
Coleman et al.

[11] 3,878,307
[45] Apr. 15, 1975

[54] PROCESS FOR PRODUCING CURED MEATS

[75] Inventors: Michael Herder Coleman, Putnoe; Roland Sydney Hannan, Pinner; David Richard Duke Osborne, Riseley, all of England

[73] Assignee: Lever Brothers Company, New York, N.Y.

[22] Filed: Jan. 7, 1974

[21] Appl. No.: 431,452

Related U.S. Application Data
[63] Continuation-in-part of Ser. No. 229,578, Feb. 25, 1972, abandoned.

[30] Foreign Application Priority Data
Mar. 2, 1971 United Kingdom................. 5823/71
Mar. 8, 1971 United Kingdom................. 6283/71

[52] U.S. Cl. .............................................. 426/266
[51] Int. Cl............................................. A23b 1/02
[58] Field of Search ............ 426/224, 264, 265, 266

[56] References Cited
UNITED STATES PATENTS
2,863,777 12/1958 Dekker............................... 426/224
3,690,901 9/1972 Hinkley.............................. 426/224

OTHER PUBLICATIONS
Mirna, "Die Fleischwirtschaft," 1972, pgs. 847–898, Translation of German article entitled Uber Die Barabsetzung des Gehaltes an Nitrit in Fleischwaren.

*Primary Examiner*—Hyman Lord
*Attorney, Agent, or Firm*—Kenneth F. Dusyn; Arnold Grant

[57] ABSTRACT

In the preparation of cured meat, curing is carried out under conditions such as to control the amount of free nitrite that remains in the cured meat, and at least the major proportion of the residual free nitrite is then destroyed without significantly affecting the cured colour by means of a substance that reacts with said residual free nitrite, said substance containing sulfur dioxide in combined form and being selected from the group consisting of alkali metal sulfites, bisulfites, and thiosulfates.

5 Claims, No Drawings

PROCESS FOR PRODUCING CURED MEATS

This application is a continuation-in-part of application Ser. No. 229,578, filed Feb. 25, 1972, now abandoned.

This invention relates to the manufacture of cured meats, and specially those forms of cured meat, such as bacon, that after curing are cooked at high temperature, as by grilling or frying, to prepare them for eating.

In the manufacture of bacon, pork is treated with a curing brine containing an alkali metal nitrite. The salt taken up from the brine has a preservative action, while the nitrite has the distinctive function of reacting with the pigments myoglobin and haemoglobin present in the pork and thus converting them to their nitrosyl derivatives, which give bacon its characteristic colour. It is however, customary to employ considerably more nitrite than is necessary to bring about substantially complete conversion to the nitrosyl derivatives, for nitrite is specially active against particular food-spoiling micro-organisms of the species Clostridium and Salmonella.

The present invention is connected with our discovery that, when bacon or other cured meat obtained with the use of excess nitrite is cooked at high temperature, in particular by grilling or frying as distinct say from prolonged immersion in boiling water, the cooked product contains the material N-nitrosopyrrolidine (NNP), a compound known to be a carcinogen, and often also the carcinogenic compound dimethylnitrosamine (DMN). By distilling samples of fried and grilled bacon in steam, we have identified NNP in the volatilised material in amounts corresponding to as much as 50 parts per $10^9$. The presence of such material in a foodstuff is clearly undesirable.

We have considered the possibility of carrying out the curing operating using an amount of nitrite that is no more than that required to ensure the desired colour formation, but have dismissed this as impracticable. According to the invention, we first cure meat so as to leave a free nitrite content of 10 – 80 parts per $10^6$ in the cured meat, and then destroy at least the major proportion of the residual free nitrite by treating the cured meat with a substance that reacts with the nitrite but does not significantly affect the nitrosyl pigments and so does not affect the colour. The reactive substance we use contains sulphur dioxide in combined form and is selected from the group consisting of alkali metal sulphites, bisulphites and thiosulphates. Free sulphur dioxide is (being a toxic gas) far less convenient to employ, although it can be effectively used, and is — once introduced into the meat — safe, because being very reactive it does not long remain free.

As illustrated later, the reactive substance is employed in an amount corresponding to from about 50 to about 500 parts by weight of combined $SO_2$ per $10^6$ parts by weight of meat. So as not to distrub unduly the distribution of salt in the bacon or other cured meat, the reagent may be dissolved in brine before being brought into contact with the meat. The brine/reagent solution may be injected into the meat, or (as when the meat is in slices up to about 1 cm thick) the meat may be immersed in the solution. Treatment is conveniently carried out at the temperatures usually employed in bacon curing procedures, for example at 5° – 10°C.

The invention can be applied to the reduction of nitrite level in bacon cured by such methods as the traditional Wiltshire (in which blocks of pork are immersed in curing brine), the well-known brine-injection procedure, and the slice-cure procedure described in our U.S. Pat. No. 2,974,047. The invention can also, as described in Example 1 later in this specification, very conveniently be carried out subsequent to a bacon-curing procedure in which:

a. sliced frozen pork is enclosed in a pack with brine containing an amount of nitrite such as will leave some 10 – 80 parts/$10^6$ of free nitrite after the formation of the desired bacon colour;

b. the pack is sealed in vacuo and the cure is allowed to proceed, suitably by storage at room temperature for 16 hours.

The salt content of bacon cured by this procedure, as of bacon cured by the known procedures, is usually in the range of 3 – 10% sodium chloride weight/weight of aqueous phase of the cured meat.

The invention can also be applied to the reduction of nitrite level in chopped pork and ham products and burgers.

In the preferred method of the invention, an alkali metal sulphite or bisulphite preferably sodium sulphite, sodium bisulphite or sodium thiosulphate, is employed as the reagent to reduce the level of nitrite in cured bacon. The amount used is preferably such as not only to remove substantially all the nitrite, but also to act as a preservative additional to the salt already present, thus at least to some extent compensating for the loss of preservative effect arising from destruction of nitrite. Suitable levels are in the range 50 –500, preferably 350 – 450, parts by weight of combined $SO_2/10^6$ parts by weight of meat. If a nitrite-destroying reagent is used that has no preservative effect, e.g., sodium thiosulphate, then it may be used in conjunction with a suitable preservative; alternatively the level of salt in the bacon may be appropriately increased.

The invention is further illustrated by the following Examples.

EXAMPLE 1

100g of frozen (−2°C) sliced pork (3 slices; slice thickness, 4mm) were put in a pouch made of air-impermeable polyethylene/ cellulose laminate, and 20 ml of a 30% w/v brine containing $7.5 \times 10^{-3}$g of sodium nitrite were added. The pouch was sealed in vacuo, and stored for 16 hours at room temperature. The pack was then opened, and a solution of sodium metabisulphite ($Na_2S_2O_5 = Na_2O + 2SO_2$; $70 \times 10^{-3}$g) in 5 ml of 30% w/v brine was introduced into it. The pack was re-sealed in vacuo and allowed to stand for a further 16 hours at room temperature. The cured material had a good colour (not markedly different from that of the cured product before treatment with sodium metabisulphite) and it proved to have a nitrite content of only 2 parts in $10^6$. On frying or grilling, it generated less than 1 part in $10^9$ of NNP. By contrast, some 20 parts NNP per $10^9$ were generated on grilling or frying cured material (nitrite content 65 parts in $10^6$) obtained following generally the procedure just described but without the addition of sodium metabisulphite.

EXAMPLE 2

The procedure of Example 1 was repeated exactly with the difference that sodium thiosulphate pentahydrate ($Na_2S_2O_3 5H_2O = Na_2O + S + 5H_2O + SO_2$; 48 mg) was substituted for the sodium metabisulphite. The product contained 5 parts of free nitrite in $10^6$, and generated 2 parts in $10^9$ of NNP on grilling or frying.

EXAMPLE 3

Two paired back blocks A and B of pork, each weighing about 15 lb and of thickness about 10 cm at the thickest part, were injected with brines in a conventional manner using multiple needle injection apparatus. The brines were conventional 30% injection brines (containing salt, alkali metal polyphosphate, and sodium nitrite) except that the brine injected into block B additionally contained sodium metabisulphite in an amount of 4,200 parts by weight per $10^6$ of brine. The sodium nitrite content of each brine was 300 per $10^6$.

The amount of brine taken up was the same in each case; with block B (the brine that contained sodium metabisulphite) uptake corresponded to an amount of combined $SO_2$ equal to about 325 parts by weight per $10^6$ parts by weight of the meat.

The blocks were thereafter conventionally matured at 30°F for 20 hours, heated for 1 hour at 110°F, and then smoked for 1 hour (smoke density 15%) at 110°F, in a conventional smoke oven. The blocks were then plate-frosted for 2 hours, tempered at 18°F for 24 hours, and sliced. The slices were vacuum-packed.

After storage for 3 days at ambient temperature, the packs were opened and samples were removed from them, some for analysis to determine the content of residual nitrite and of combined sulphur dioxide, and some for grilling followed by determination of volatile nitrosamines thus generated. Results were:

| Block | Residual nitrite per $10^6$ | Combined $SO_2$ per $10^6$ | Nitrosamines per $10^9$ DMN | NNP |
|-------|---|---|---|---|
| A | 13.3 | — | 1.4 | 7.8 |
| B | 3.7 | 172 | 0 | 0.3 |

We claim:
1. In a process for producing cured meat which comprises contacting the meat with brine containing an alkali metal nitrite under conditions wherein a free nitrite content of from 10 to 80 parts per million is left in the cured meat, the improvement which comprises destroying at least the major portion of the residual free nitrite by treating said cured meat with a substance dissolved in brine that reacts with nitrite but does not significantly affect the color of said cured meat, said substance (a) containing sulphur dioxide in combined form and being selected from the group consisting of alkali metal sulphites, bisulphites and thiosulphates, and (b) being employed in an amount of from about 50 to about 500 parts by weight of combined sulphur dioxide per million parts by weight of said cured meat.

2. A process according to claim 1, wherein said substance containing sulphur dioxide in combined form is sodium sulphite or bisulphite.

3. A process according to claim 1, wherein said substance is employed in an amount corresponding to from about 350 to about 450 parts by weight of combined sulphur dioxide per $10^6$ parts by weight of meat.

4. A process according to claim 1, wherein said substance containing sulphur dioxide in combined form is sodium thiosulphate.

5. A process according to claim 1, wherein said cured meat is bacon.

* * * * *